UNITED STATES PATENT OFFICE.

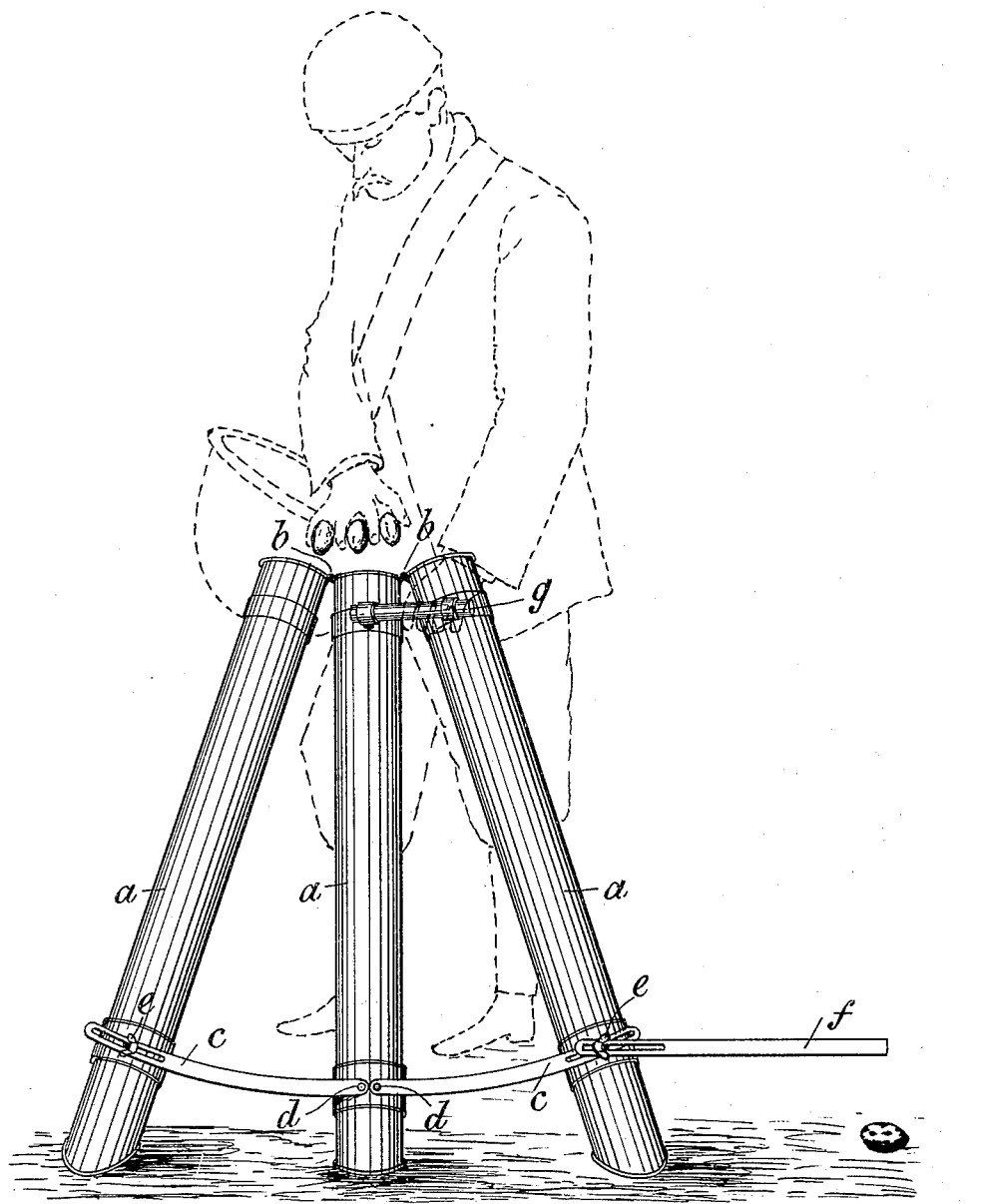

CECIL LEONARD JERVIS, OF NEWARK, ENGLAND.

APPARATUS FOR PLANTING POTATOES OR SEEDS.

SPECIFICATION forming part of Letters Patent No. 693,716, dated February 18, 1902.

Application filed December 2, 1901. Serial No. 84,492. (No model.)

*To all whom it may concern:*

Be it known that I, CECIL LEONARD JERVIS, a subject of the King of Great Britain, residing at Norton Disney, Newark-on-Trent, in the county of Nottingham, England, have invented certain new and useful Improvements in or Relating to Apparatus for Planting Potatoes or Seeds, of which the following is a specification.

The object of this invention is to provide a simple and efficient apparatus by means of which potatoes and seeds may be planted at regular intervals and in one or more rows simultaneously. Said apparatus may be designed for hand use, or it may be arranged in connection with a vehicle for use with horse or motor power. In both cases a saving in labor and time is effected.

In the accompanying drawing, illustrating my invention, the figure is a perspective view.

According to this invention, as designed with a handle $g$ for hand use and shown in the accompanying drawing, I group a suitable number of tubes $a$, the upper ends of which are hinged or otherwise flexibly connected together at $b$, so as to enable their lower ends to be separated more or less, according to the desired spacing out. The lower ends of the tubes are connected to each other by slotted bars $c$, pivoted at $d\ d$ to the central tube, through the slots of which bars bolts attached to the tubes may work, winged nuts $e$ being provided on said bolts to set or secure the tubes in their desired position. Any other equivalent means may be employed for adjusting and setting purposes, or such devices may be dispensed with and the tubes fixed in position. It will thus be seen that the tubes radiate from a point above their upper ends, and it is understood that two or more of such sets of tubes may be arranged together as one apparatus, according to the number of rows to be planted simultaneously.

In using this hand apparatus the laborer rests the tubes in the trench and feeds the potatoes or the seed one into each upper end thereof by hand from a suitable receptacle secured to his person, as illustrated, after which he moves the tubes to the next position, guided by a gage $f$, attached to the tubes, and feeds again, and so on.

In applying the apparatus for horse or motor power the tubes are arranged radially from a hollow hub into which the potatoes or seeds are fed by any suitable means in such a manner that the tubes are as tubular spokes of a wheel (or a portion of a wheel) which is capable of revolving or oscillating. Hence a horse-propelled machine or apparatus may comprise more than one such wheel or part of a wheel. The tubes may be formed to telescope in order to vary the intervals of setting by shortening or lengthening them. A convenient arrangement of this latter apparatus consists in combining same with a trenching or plowing and covering implement, so that as the implement is propelled it first plows the trench, then plants the potatoes or seed, and finally rakes over the earth to cover the potatoes or seeds.

I claim—

1. Apparatus for planting potatoes and seeds, consisting of a plurality of tubes, the upper ends of which adjoin each other and the lower ends of which are separated a distance equal to the desired spacing out, substantially as set forth.

2. The combination, with a plurality of tubes arranged as described, of flexible connections between the upper ends of said tubes and means for regulating and fixing the lower ends of said tubes in their desired separated position substantially as set forth.

3. The combination, with a plurality of tubes arranged as described, of an adjustable gage, whereby to determine the position or distance the next planting should be from the potatoes or seeds already planted, substantially as set forth.

4. The combination of a plurality of sets of tubes arranged as described, each set being flexibly connected to the next set and provided with means whereby to permit of adjustment to the desired distance apart of the trenches, substantially as set forth.

In testimony whereof I have hereunto set my hand in presence of two subscribing witnesses.

CECIL LEONARD JERVIS.

Witnesses:
GEORGE C. DOWNING,
WALTER J. SKERTEN.